United States Patent [19]

Waldman

[11] Patent Number: 4,968,866
[45] Date of Patent: *Nov. 6, 1990

[54] CLOSED LOOP INDUCTION TYPE ELECTRICAL WIRE PREHEATER

[75] Inventor: Myron Waldman, Pawtucket, R.I.

[73] Assignee: WST Power Electronics, Inc., Providence, R.I.

[*] Notice: The portion of the term of this patent subsequent to Dec. 13, 2005 has been disclaimed.

[21] Appl. No.: 282,205

[22] Filed: Dec. 9, 1988

Related U.S. Application Data

[63] Continuation-in-part of Ser. No. 103,684, Oct. 2, 1987, Pat. No. 4,791,260.

[51] Int. Cl.$^5$ ............................................. H05B 6/44
[52] U.S. Cl. ...................... 219/10.61 R; 219/10.493; 219/10.71; 219/10.79
[58] Field of Search ................ 219/10.61 R, 10.61 A, 219/10.492, 10.71, 10.79, 10.43

[56] References Cited

U.S. PATENT DOCUMENTS

| | | | |
|---|---|---|---|
| 2,448,009 | 8/1948 | Baker | 219/10.79 X |
| 3,117,209 | 1/1964 | Peltier | 219/10.61 R |
| 3,176,111 | 3/1965 | Peltier | 219/10.61 R |
| 3,329,591 | 7/1967 | Müller et al. | 219/10.61 R |
| 4,221,947 | 9/1980 | Bonikowski et al. | 219/10.61 R |
| 4,315,124 | 2/1982 | Granstrom et al. | 219/10.71 |
| 4,585,916 | 4/1986 | Rich | 219/10.61 R |
| 4,791,260 | 12/1988 | Waldman | 219/10.61 R |

*Primary Examiner*—Philip H. Leung
*Attorney, Agent, or Firm*—Irving M. Kriesgsman

[57] ABSTRACT

An induction wire preheater for heating electrical wire includes left and right inductors, each having a longitudinal passageway through which the wire being heated is passed. Both inductors are fixedly mounted on a mounting plate and/are tilted relative to each. A lower wheel is rotatably mounted on the mounting plate below the inductors, and an upper wheel is rotatably mounted on the mounting plate above the inductors. First, second and third auxiliary wheels are also provided. In use, wire enters the preheater from the right, passes under the first auxiliary wheel, over the upper wheel, through the left inductor, under the lower wheel, through the right inductor, over the second auxiliary wheel, over the upper wheel a second time, under the third auxiliary wheel and then exits from the left.

7 Claims, 5 Drawing Sheets

CLOSED LOOP INDUCTION TYPE ELECTRICAL WIRE PREHEATER

CROSS-REFERENCE TO RELATED APPLICATION

This application is a continuation-in-part of copending patent application Ser. No. 103,684 filed on 10-2-87 in the name of Myron Waldman and now issued as U.S. Pat. No. 4,791,260.

BACKGROUND OF THE INVENTION

The present invention relates generally to induction type electrical wire preheaters and more particularly to closed loop induction type electrical wire preheaters.

As used herein, the term "intermediate diameter wires" refers to wires having diameters between about 0.101 inches to about 0.032 inches and the term "small diameter wires" refers to wires having diameters between about 0.025 inches to about 0.01 inches.

Closed loop induction type wire preheaters are well known devices used extensively in the insulated wire manufacturing industry for preheating wire or cable which is being fed into an extrusion die. In such devices, the wire being heated acts as the moving secondary of a transformer and the primary voltage is used to control the wire temperature.

In U.S. Pat. No. 3,117,209 to W. L. Peltier there is disclosed an example of a closed loop induction type electric wire preheater. The preheater includes an upper wheel of predetermined size and made of conductive material, a lower wheel of the same size as the upper wheel and positioned below the upper wheel and an inductor (i.e., transformer), with the inductor being positioned between the two wheels. The inductor includes two vertical spaced apart insulated passageways, with the distance between the two passageways being equal to the diameter of the wheels. In use, the wire being heated enters the device from one side, passes over the upper wheel, down through one of the passageways in the inductor and under the lower wheel, up through the other passageway in the inductor, over the upper wheel again and then exits the device through the other side. Since the distance between the two passageways is fixed, the diameter of the upper wheel is also fixed. This is a limiting factor for production flexibility since the size of the upper wheel used with small sized wire is usually made much smaller than the size of upper wheel used with intermediate sized wire to minimize heat losses at the wheel itself.

In U.S. Pat. No. 3,176,111 there is shown an adapter which serves as a replacement for the upper wheel on the preheater shown in U.S. Pat. No. 3,117,209 when small size wire is being run. The adapter comprises a plate on which is rotatably mounted an upper wheel and an idler wheel, the upper wheel on the plate being sized smaller than the upper wheel which is being replaced. When the plate is mounted on the preheater in place of the normal upper wheel, the left edge of the idler wheel is vertically over the left passageway of the inductor and the right edge of the replacement upper wheel is vertically over the right passageway. Wire enters the preheater from the left and exits the preheater from the right.

Another example of a closed loop induction wire preheater may be found in U.S. Pat. No. 4,221,947.

It is an object of this invention to provide a new and improved closed loop induction type electrical wire preheater.

SUMMARY OF THE INVENTION

A closed loop induction type preheater for use in heating electrical wire constructed according to the teachings of the present invention includes in one embodiment a mounting plate, left and right inductors mounted on the mounting plate, each inductor having a longitudinal insulated passageway, an upper wheel, first, second and third auxiliary wheels, a lower wheel and a power supply. The left inductor is fixedly attached to the mounting plate with its passageway tilted to the left. The right inductor is fixedly attached to the mounting plate with its passageway tilted to the right. The lower wheel is rotatably mounted on the mounting plate below the inductors and the upper wheel is rotatably mounted on the mounting plate above the inductors. The three auxiliary wheels are rotatably mounted on the mounting plate.

In use, the wire being heated enters the preheater from the right passes under the first auxiliary wheel, over the upper wheel, down through the left inductor, under the lower wheel, up through the right inductor over the second auxiliary wheel, over the upper wheel again, under the third auxiliary wheel and then exits the preheater from the left.

Various features and advantages will appear from the description to follow. In the description, reference is made to the accompanying drawing which forms a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE INVENTION

In the drawings wherein like reference numerals represent like parts:

FIG. 1 is a simplified front elevation view, broken away in section in parts, of one embodiment of a preheater constructed according to the teachings of the present invention arranged for use in heating intermediate diameter wires, FIG. 2 is a side view of the preheater shown in FIG. 1, FIG. 3 is a simplified front elevation view of the preheater shown in FIG. 1, but arranged for use in heating small diameter wires, FIG. 4 is a simplified front elevation view, broken away in section in parts, of a modification of the preheater shown in FIG. 1, arranged for use in heating intermediate diameter wires, FIG. 5 is a simplified front elevation view of the embodiment of the preheater shown in FIG. 4, but arranged for heating small diameter wires, and FIG. 6 is a simplified front elevation view of another embodiment of the invention.

DETAILED DESCRIPTION OF PREFERRED EMBODIMENTS

Figure 1:
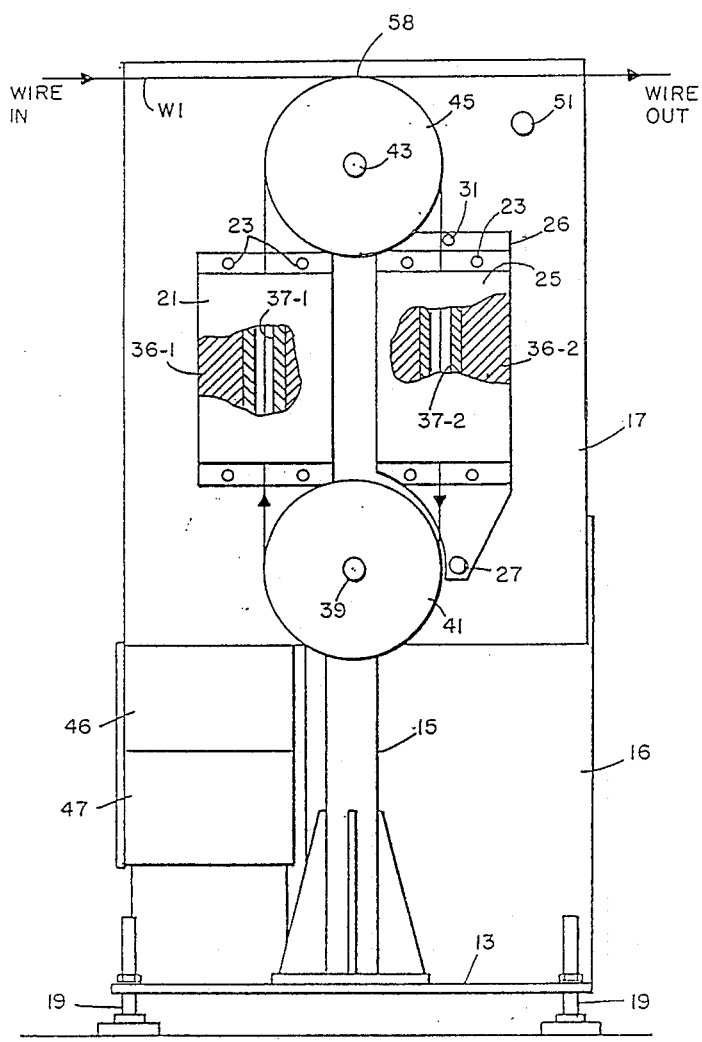
Figures 2, 3:
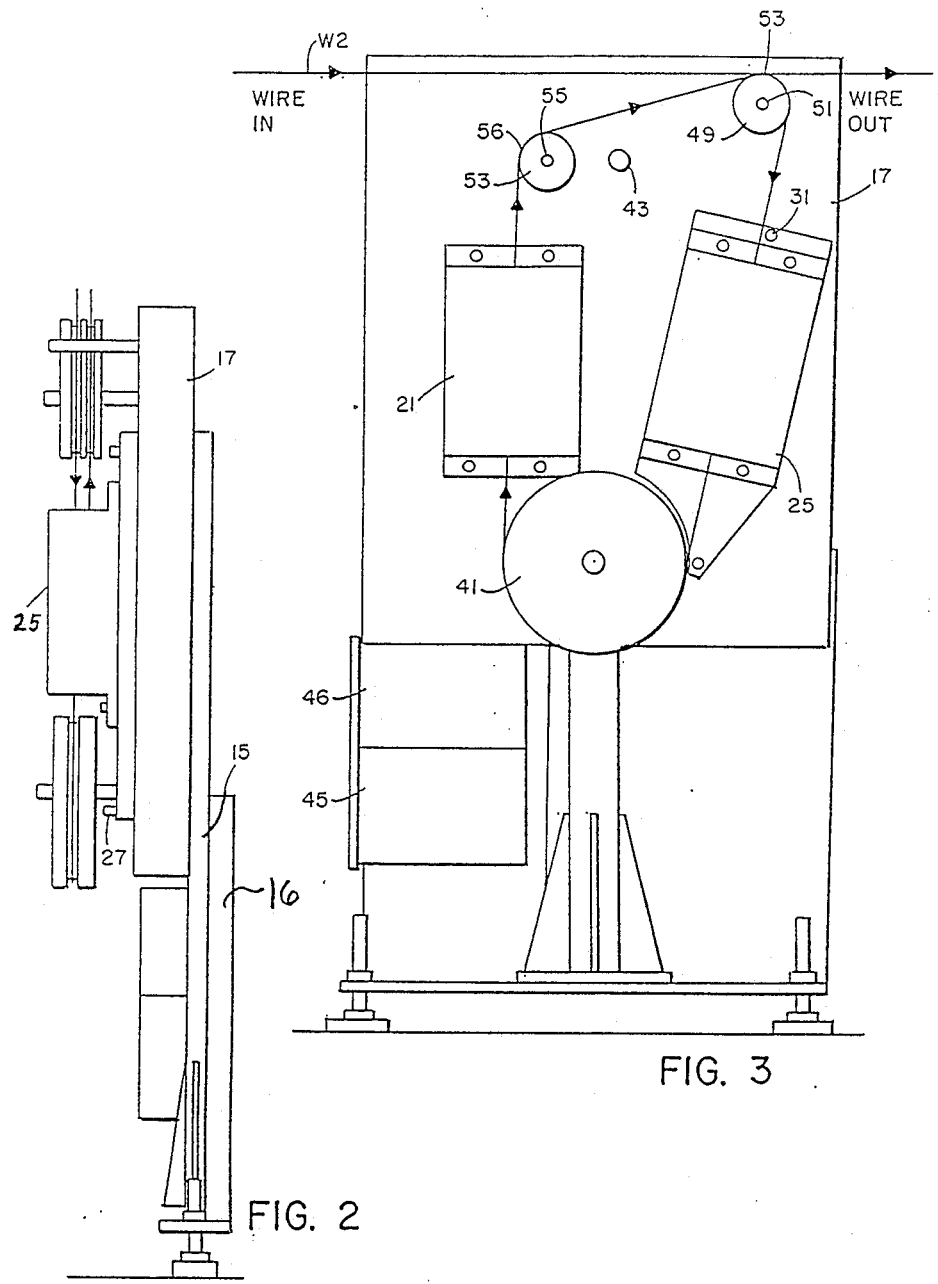

Referring now to the drawings, there is illustrated in FIGS. 1 through 3 an embodiment of a preheater constructed according to the teachings of the present invention. Portions of the preheater not pertinent to the invention are not shown. In FIGS. 1 and 2 the preheater is shown set up for handling intermediate diameter wires. In FIG. 3 the preheater is shown set up for handling small diameter wires.

Referring back to FIGS. 1 and 2, the preheater includes a base 13, a frame 15 fixed to base 13, a backplate 16 fixed to base 13 and a mounting plate 17 fixed to frame 15. Base 13 is supported on a plurality of adjustable mounting feet 19.

A first or left inductor 21 is fixedly mounted on plate 17 by a set of bolts 23. A second or right inductor 25, identical in construction to first inductor 21, is fixedly mounted by bolts 23 onto an intermediate plate 26 which is pivotally mounted on plate 17 by a pin 27 which is fixed to plate 17. A bolt 31 which screws through a hole in plate 26 and into either one of a pair of suitably positioned threaded holes in plate 17 secures second inductor 25 in either a first or vertical position (as shown in FIG. 1) or a second or tilted position (as shown in FIG. 3). Since the preheater is set up for handling intermediate size wire in FIG. 1, inductor 25 is positioned vertically. Each one of the inductors 21, 25 includes a core, the cores being labelled 36-1 and 36-2, respectively. Each core 36-1, 36-2 has a longitudinal insulated passageway extending from the top to the bottom and through which the wire being heated is passed. The passageways being labelled 37-1 and 37-2, respectively. As can be seen in FIG. 1, inductor 21 is mounted on plate 17 with its passageway 37-1 vertical and inductor 25 is mounted on plate 17 so that its passageway 37-2 is also vertical.

A shaft 39 is fixedly mounted on plate 17 below inductors 21 and 25 and a lower wheel 41 is rotatably mounted on a shaft 39. A shaft 43 is fixedly mounted on plate 17 above inductors 21 and 25 and vertically aligned with shaft 39. A first upper wheel 45 which is made of conductive material is rotatably mounted on shaft 43. Upper wheel 45 is sized to accommodate intermediate size wire. Lower wheel 39 is the same size as upper wheel 43. The distance between the centers of passageways 37-1 and 37-2 is equal to the diameter of the two wheels 41 and 45 so that the wire being heated can pass through the passageways from one wheel to the other without touching the passageway sidewalls. Lower wheel 41 contains a single wire receiving groove while upper wheel 45 contains a pair of wire receiving grooves.

A power supply 46 supplies current to inductors 21 and 25 through a series, parallel switch 47. For simplicity the connections between switch 47, power supply 45 and inductors 21 and 25 are not shown.

When intermediate size wire is being run, as in FIG. 1, switch 47 is placed in a position such that current is applied to inductors 21 and 25 in parallel. When small size wire is being run, as will hereinafter be described in conjunction with FIG. 3, current is applied to inductors 21 and 25 in series.

Referring back to FIG. 1, the wire W1 to be heated, which is intermediate diameter in size, enters preheater horizontally from the left side near the top, passes over upper wheel 45 (in one of the grooves) and down through passageway 37-2 in second inductor 25, under lower wheel 41 and up through passageway 37-1 in first inductor 21, over upper wheel 45 again (in the other groove) and then exits the preheater horizontally from the right side near the top.

As is apparent, the path travelled by wire W1 in the preheater is similar to the path the wire travels in the preheater in U.S. Pat. No. 3,117,209.

When small diameter wires are to be run, the preheater is modified as shown in FIG. 3. First upper wheel 45 is removed and second inductor 25 is rotated to the right to its tilted position and secured in place by bolt 31. A second or replacement upper wheel 49 is rotatably mounted on a shaft 51 which is fixedly mounted on plate 17 and an idler wheel 53 is rotatably mounted on a shaft 55 which is also fixedly mounted on plate 17. Shaft 55 is mounted on plate 17 at a location such that the left edge 56 of wheel 53 is vertically above the center of the passageway 37-1 in left inductor 21. Wheel 49 is made of conductive material and has two grooves as is the case with wheel 45. However, wheel 49 is sized smaller than wheel 45 to accommodate small diameter wires. Idler wheel 53 is made of nonconductive material so as to absorb as little heat as possible from the wire being run. Shaft 51 is mounted on plate 17 at a location such that the top edge 53 of wheel 49 is considerably closer to the right or exit end of preheater 11 than the top edge 58 of wheel 45 as shown in FIG. 1. In particular, the top edge 58 of wheel 45 is aligned vertically with shaft 41 while top edge 53 of wheel 49 is aligned with the passageway 37-2 of inductor 25 when it is in the tilted position. Consequently, the distance the heated wire travels from wheel 49 to the extrusion die is less than the distance the wire travels from wheel 45 to the extrusion die. Thus, the heat loss in space will be less when wheel 49 is used and mounted as shown in FIG. 3.

In use, wire W2, which is small size wire, enters the preheater horizontally from the left, passes over wheel 49 and down through second inductor 25, under lower wheel 41 and up through first inductor 21, over idler wheel 53 and over second upper wheel 49 again and then exits the preheater horizontally from the right.

Figure 4:
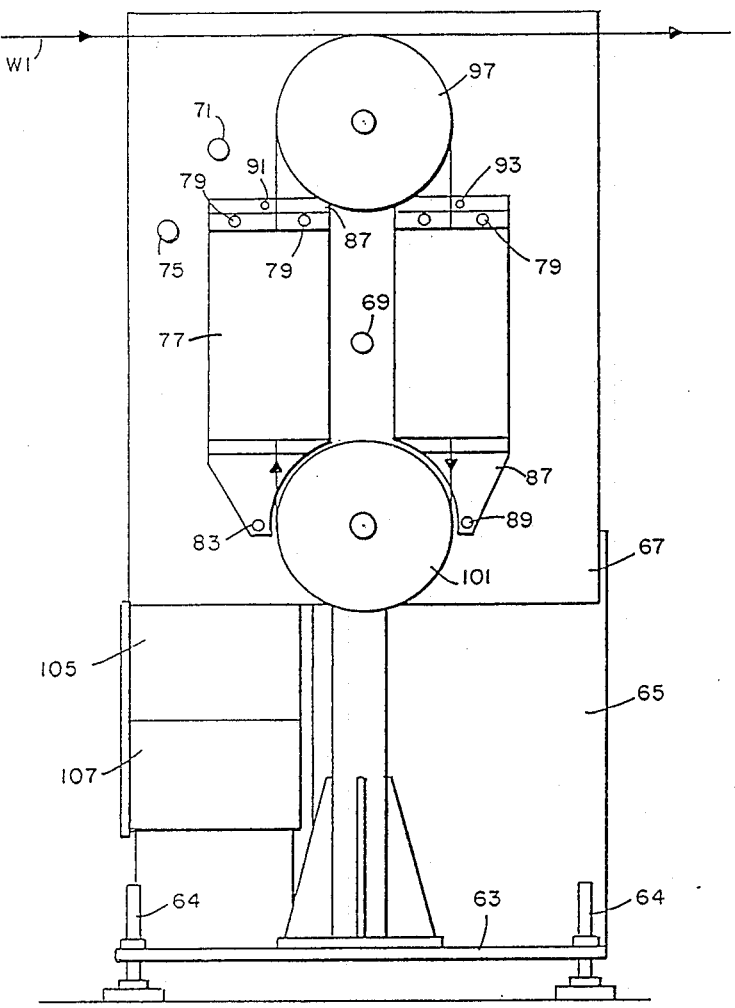
Figure 5:
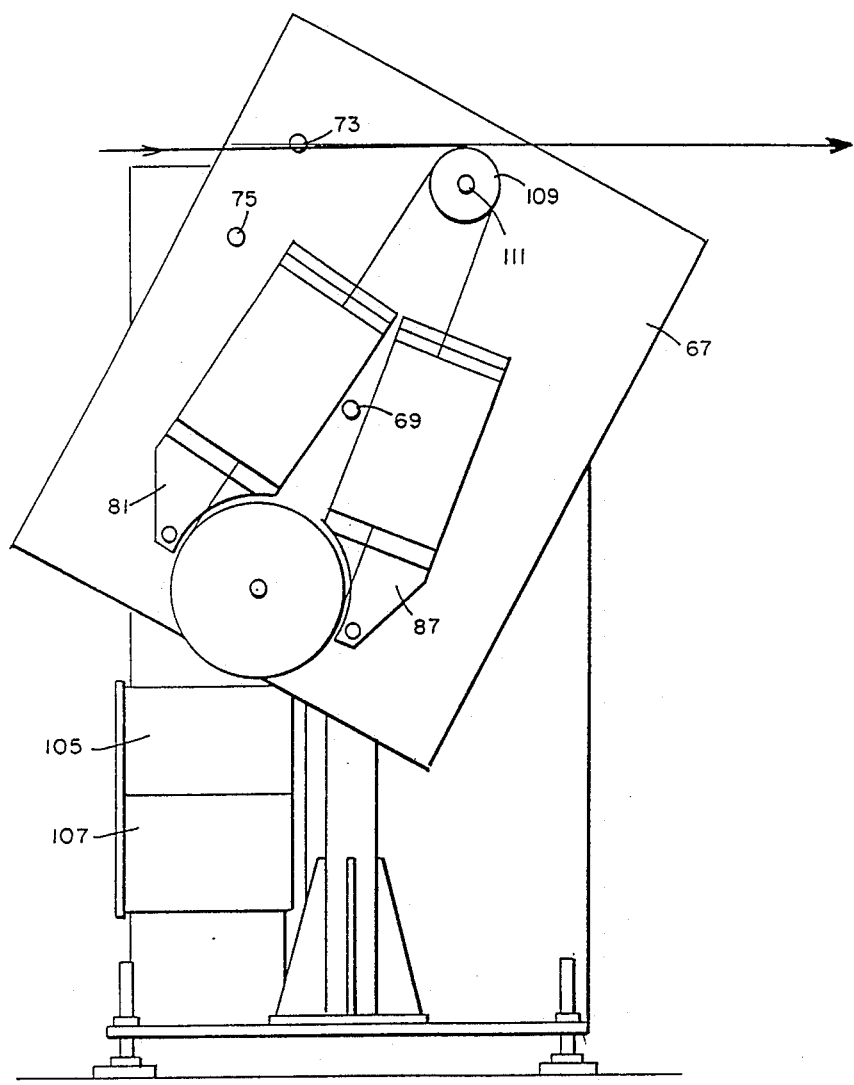

Referring now to FIGS. 4 and 5 there is illustrated another embodiment of a preheater constructed according to this invention. In FIG. 4, the preheater is shown set up for handling intermediate diameter wires, while in FIG. 5 the preheater is shown set up for handling small diameter wires.

Referring first to FIG. 4, the preheater includes a base 63 having adjustable mounting feet 64, a plate 65 fixedly mounted on base 63 and a plate 67 pivotally mounted through a pin 69 on plate 65. A bolt 71, which is insertable through either one of two mounting holes 73 and 75 and then into a threaded hole in plate 65 fixedly secures plate 67 to plate 65 in either a vertical position (as in FIG. 4) or a tilted position (as in FIG. 5).

A first inductor, 77 identical to inductor 21, is fixedly mounted by bolts 79 on an intermediate plate 81 which is pivotally mounted by a pin 83 on plate 67. A second inductor 85, which is identical to inductor 77, is fixedly mounted by bolts 79 on an intermediate plate 87 which is pivotally mounted by a pin 89 on plate 67. Bolts 91 and 93 secure inductors 77 and 85, respectively, on plate 67 either vertically as shown in FIG. 3 or tilted inward towards each other to form an inverted "V" as shown in FIG. 5.

An upper wheel 97, identical to wheel 45, is rotatably mounted on a shaft 99 which is fixedly mounted on plate 67 above the two inductors. A lower wheel 101 identical to wheel 41 is rotatably mounted on a shaft 103 which is fixedly mounted on plate 67 below inductors 77 and 85 and vertically aligned with shaft 99.

A power supply 105, similar to power supply 46, supplies current to inductors 77 and 85 through a switch 107, similar to switch 47.

In use, wire W1 to be heated enters preheater horizonally from the left, passes over upper wheel 97 and down through second inductor 85, under lower wheel 101 and up through first inductor 77, over upper wheel 97 again and then exits the preheater from the right.

When small diameter wire is to be run, the preheater is modified as in FIG. 5. More specifically, upper wheel 97 is removed and a second upper wheel 109, identical to second upper wheel 49, is rotatably mounted on a shaft 111 which is fixedly mounted on plate 67 vertically above shaft 99. Also, intermediate plates 81 and 87 are tilted inward so that the inductor passageways will be aligned with the wire as it travels between the two wheels. In addition, plate 67 is tilted to the right so that wheel 109 will be closer to the extrusion die.

The wire to be heated is fed through the components in the preheater as arranged in FIG. 5 in the same way as the FIG. 4 arrangement.

Alternately, in the FIGS. 4 and 5 arrangements, the wire could enter from the right and exit from the left.

As can be appreciated, the preheater in FIG. 5 does not include an idler wheel.

Figure 6:
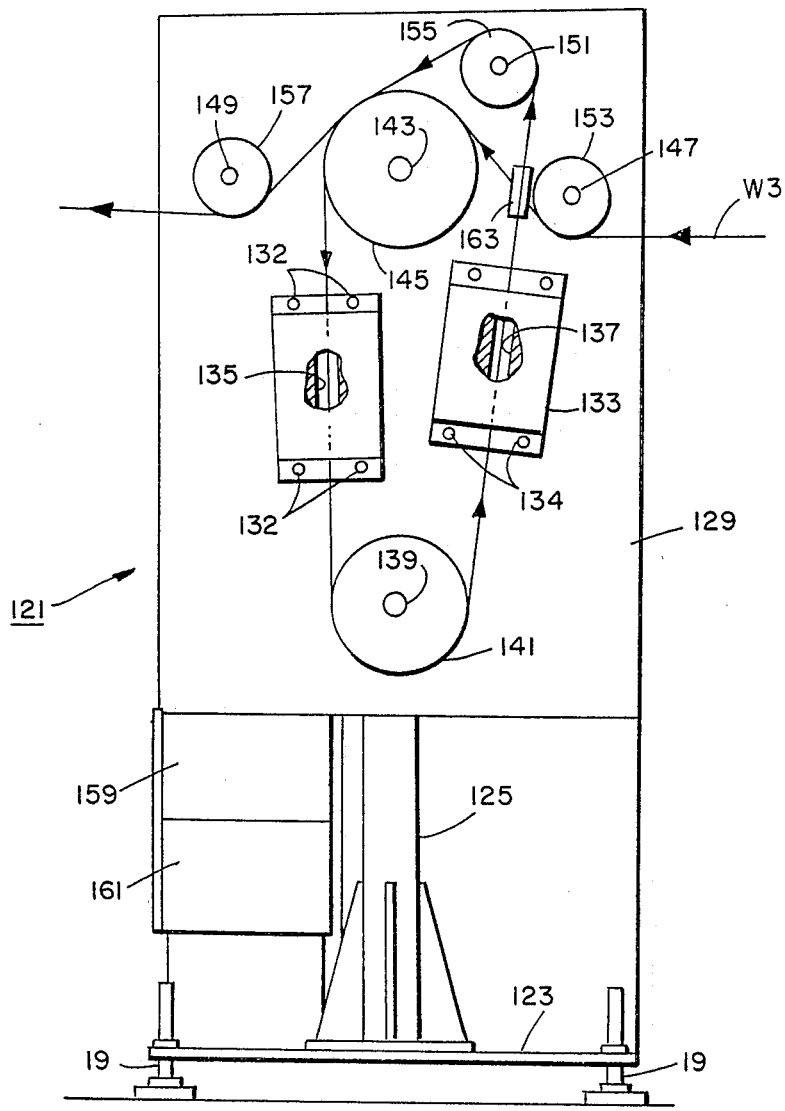

Referring now to FIG. 6 there is shown another embodiment of a preheater constructed according to this invention, the preheater being identified by reference numeral 121.

Preheater 121 includes a base 123, a frame 125 fixed to base 123, a backplate 127 fixed to base 123 and a mounting plate 129 fixed to frame 125, all of which are identical to their corresponding parts in FIG. 1.

A left inductor 131, identical to inductor 21, is fixedly mounted on plate 129 by a set of bolts 132 and a right inductor 133, identical to inductor 25, is fixedly mounted on plate 129 by a set of bolts 134. Left inductor 131 is mounted on plate 129 with its passageway 135 tilted up and to the left while right inductor 133 is mounted on plate 129 at a higher position than left inductor 131 and with its passageway 137 tilted up and to the right.

A shaft 139 is fixedly mounted on plate 129 below inductors 131 and 133 and a lower wheel 141 is rotatably mounted on shaft 139. A shaft 143 is fixedly mounted on plate 129 above inductors 131 and 133 and vertically aligned with shaft 139. An upper wheel 145 which is made of conductive material is rotatably mounted on shaft 143. Lower wheel 141 is smaller than upper wheel 145. Lower wheel 141 and upper wheel 145 each include a wire receiving groove. Three shafts 147, 149 and 151 are fixedly mounted on plate 129 and auxiliary wheels 153, 155 and 157 are rotatably mounted on shafts 147, 149 and 151, respectively.

Wheels 153, 155 and 157 are preferably made of nonconductive material so as to absorb as little heat as possible.

A power supply 159 supplies current to inductors 131 and 133 through a series, parallel switch 161. For simplicity the connections between switch 161, power supply 159 and inductors 131 and 133 are not shown.

In use, the wire W3 to be heated enters preheater from the right side, passes under first auxiliary wheel 153, under a bridge 163 which is mounted on plate 129 over upper wheel 145, down through left inductor 131 under lower wheel 141, up through right inductor 133, over bridge 163, over second auxiliary wheel 155, over upper wheel 145 again under third auxiliary wheel 157 and then exits the preheater from the left side.

Bridge 163 is made of nonconductive material and is used to insulate the wire as it is passing from wheel 153 to wheel 145 from the wire as it is passing from inductor 133 to wheel 155. Also, since inductor 133 is higher than inductor 131, it is easier to string the wire through the apparatus.

As can be appreciated, this arrangement maximizes the layout of parts on plate 129 (i.e. takes up less space).

It should be understood that the wire preheater of this invention is not limited to use solely with wire being fed into an extrusion die.

The embodiments of the present invention are intended to be merely exemplary and those skilled in the art shall be able to make numerous variations and modifications to it without departing from the spirit of the present invention. For example, in FIG. 3, inductor 25 could be made fixed, inductor 21 could be made pivotally mounted and the wire brought in from the right and made to exit from the left. In FIG. 1, the wire could be brought in from the right and made to exit from the left with no changes. In the FIG. 6 embodiment, a smaller sized lower wheel could be used if it is mounted on plate 129 at a lower location or a larger sized lower wheel used and mounted at a higher location on plate 129. All such variations and modifications are intended to be within the scope of the present invention as defined in the appended claims.

What is claimed is:

1. A preheater for heating electrical wire by induction comprising:
   a. a mounting plate,
   b. a first inductor fixedly mounted on said mounting plate,
   c. a second inductor fixedly mounted on said mounting plate,
   d. each inductor having a longitudinal insulated passageway,
   e. said inductors being tilted relative to each other,
   f. an upper wheel rotatably mounted on said mounting plate above said inductors,
   g. a lower wheel rotatably mounted on said mounting plate below said inductors, and
   h. means for supplying current to the inductors,
   i. said electrical wire being heated entering the preheater, passing over the upper wheel, down through the passageway in one of the inductors and under the lower wheel, up through the passageway in the other inductor and again over the upper wheel and then exiting the preheater.

2. The preheater of claim 1 and further including first, second and third auxiliary wheels for changing the direction of the electrical wire as it passes through the preheater.

3. A preheater for heating electrical wire by induction comprising:
   a. a mounting plate,
   b. left and right inductors fixedly mounted on said mounting plate, each inductor having an insulated passageway through which the electrical wire to be heated is passed, said right inductor being mounted on said mounting plate with its insulated passageway tilted up and to the right, and said left inductor being mounted on said mounting plate with its insulated passageway tilted upward to the left,
c. a lower wheel rotatably mounted on said mounting plate below said inductors,
d. an upper wheel rotatably mounted on said mounting plate above said inductor,
e. first, second and third auxiliary wheels mounted on said mounting plate, and
f. power supply mean coupled to said inductors for applying current thereto,
g. said electrical wire to be heated entering the preheater, passing under the first auxiliary heater, over the upper wheel, down through the passageway in one of the inductors and under the lower wheel, up through the passageway in the other inductor, over the secondary auxiliary wheel, over the upper wheel again, under the third auxiliary wheel and then exiting the preheater.

4. The preheater of claim 3 and wherein the three auxiliary wheels are made of nonconductive material.

5. The preheater of claim 3 and wherein said lower wheel is smaller than said upper wheel.

6. The preheater of claim 3 and wherein said upper wheel is made of conductive materials.

7. The preheater of claim 6 and wherein one inductor is higher on said mounting plate than the other inductor.

* * * * *